United States Patent [19]
Wright

[11] Patent Number: 5,385,775
[45] Date of Patent: Jan. 31, 1995

[54] COMPOSITE ELASTIC MATERIAL INCLUDING AN ANISOTROPIC ELASTIC FIBROUS WEB AND PROCESS TO MAKE THE SAME

[75] Inventor: Robert D. Wright, Atlanta, Ga.

[73] Assignee: Kimberly-Clark Corporation, Neenah, Wis.

[21] Appl. No.: 805,736

[22] Filed: Dec. 9, 1991

[51] Int. Cl.⁶ .................... B32B 27/00; B32B 27/36; B32B 5/16; D04H 1/04

[52] U.S. Cl. .................... 428/284; 428/286; 428/287; 428/290; 428/296; 428/326; 428/340; 428/903

[58] Field of Search .............. 428/102, 230, 284, 903, 428/296, 198, 286, 287, 340, 290, 283, 326

[56] References Cited

U.S. PATENT DOCUMENTS

| | | | |
|---|---|---|---|
| 3,371,668 | 3/1968 | Johnson | 128/290 |
| 3,468,748 | 9/1969 | Bassett | 161/122 |
| 3,575,782 | 4/1971 | Hansen | 161/141 |
| 3,940,302 | 2/1976 | Matthews et al. | 156/167 |
| 4,426,420 | 1/1984 | Likhyani | 428/224 |
| 4,522,863 | 6/1985 | Keck et al. | 428/196 |
| 4,552,795 | 11/1985 | Hansen et al. | 428/110 |
| 4,606,964 | 8/1986 | Wideman | 428/152 |
| 4,652,487 | 3/1987 | Morman | 428/903 |
| 4,657,802 | 4/1987 | Morman | 428/903 |
| 4,680,213 | 7/1987 | Fourezon | 428/105 |
| 4,720,415 | 1/1988 | Vander Wielen et al. | 428/297 |
| 4,781,966 | 11/1988 | Taylor | 428/152 |
| 4,801,482 | 1/1989 | Goggans et al. | 428/68 |
| 4,863,779 | 9/1989 | Daponte | 428/284 |
| 4,879,170 | 11/1989 | Radwanki et al. | 428/284 |
| 4,891,957 | 1/1990 | Strack et al. | 428/284 |
| 4,910,064 | 3/1990 | Sabee | 428/113 |
| 4,939,016 | 7/1990 | Radwanski et al. | 428/297 |
| 4,970,104 | 11/1990 | Radwanski | 428/284 |
| 4,977,011 | 12/1990 | Smith | 428/152 |
| 4,981,747 | 1/1991 | Morman | 428/284 |
| 4,984,584 | 1/1991 | Hansen et al. | 128/898 |
| 5,200,246 | 4/1993 | Sabee | 428/109 |

FOREIGN PATENT DOCUMENTS

| | | | |
|---|---|---|---|
| 0432763 | 6/1991 | European Pat. Off. | D04H 1/56 |
| 0212284 | 3/1987 | France | D04H 1/56 |

OTHER PUBLICATIONS

*Man-Made Fibres*, R. W. Moncrieff, pp. 94-95, 1975.

Primary Examiner—George F. Lesmes
Assistant Examiner—Kathryne E. Shelborne
Attorney, Agent, or Firm—Karl V. Sidor

[57] ABSTRACT

Disclosed is a composite elastic material adapted to provide improved tenacity in one direction and which includes (1) an anisotropic elastic fibrous web having at least one layer of elastomeric meltblown fibers and at least one layer of substantially parallel rows of elastomeric filaments autogenously bonded to at least a portion of the elastomeric meltblown fibers, and (2) at least one gatherable layer joined at spaced apart locations to the anisotropic elastic fibrous web so that the gatherable layer is gathered between the spaced-apart locations. The anisotropic elastic fibrous web has a strength index of at least about 2 or less than 0.5. The substantially parallel rows of elastomeric filaments in the elastic fibrous web may have an average diameter ranging from about 40 to about 750 microns and constitute at least about 20 percent, by weight, of the anisotropic elastic fibrous web.

23 Claims, 6 Drawing Sheets

COMPOSITE ELASTIC MATERIAL INCLUDING AN ANISOTROPIC ELASTIC FIBROUS WEB AND PROCESS TO MAKE THE SAME

FIELD OF THE INVENTION

The present invention relates to a composite elastic material and a method of making the same.

BACKGROUND OF THE INVENTION

Composites of elastic and nonelastic materials have been made by bonding nonelastic materials to elastic materials in a manner that allows the entire composite to stretch or elongate so they can be used in garment materials, pads, diapers and personal care products where elasticity may be desired.

In one such composite material, a nonelastic material joined to an elastic sheet while the elastic sheet is in a stretched condition so that when the elastic sheet relaxed, the nonelastic material gathers between the locations where it is bonded to the elastic sheet. The resulting composite elastic material is stretchable to the extent that the nonelastic material gathered between the bond locations allows the elastic sheet to elongate. An example of this type of composite material is disclosed, for example, by U.S. Pat. No. 4,720,415 to Vander Wielen et al., issued Jan. 19, 1988.

In many applications, composite materials of this type are adapted to stretch and recover in only one direction such as, for example, the machine direction. Thus, the elastic component of the composite does not have to be isotropic. That is, the elastic component need not have the same stretch and recovery properties in every direction. Desirably, the elastic component would have the required stretch and recovery properties in only the direction that the gathered inelastic material allows the composite to stretch. For example, if filaments, fibers and/or strands of an elastic material were oriented in only one direction, a relatively smaller amount of elastic material could be used to provide certain levels of elastic properties, such as tension, in that one direction than if the elastic material was isotropic. Reducing the amount of elastic material in the composite would generally reduce its cost. This is an important consideration for composite elastic materials which are intended to be components single use or limited use products such as, for example, disposable personal care products.

However, conventional elastic materials such as, for example, elastic nonwoven fibrous webs and elastic tend to be relatively isotropic and less efficient for materials that stretch and recover in only one direction. Although certain composite materials that contain parallel rows of elastic filaments or strands are known to provide stretch and recovery generally in one direction, these materials are not well suited to high-speed manufacturing processes because of the difficulties of applying individual elastomeric filaments or strands to an inelastic, gatherable material.

For example, U.S. Pat. No. 3,468,748 discloses a nonwoven fabric having machine direction elasticity which contains at least one fibrous web and a plurality elastic cords, strings, bands, etc., which is joined to the fibrous web while the elastic material is stretched. Upon release of the stretching force, the elastic material contracts from its extended condition and creates puckers in the material. U.S. Pat. No. 3,575,782 discloses an elastic material which contains partially extended spaced elastic yarns sealed between two gathered fibrous webs. According to the patent, elastic yarns are stretched, joined to the fibrous webs with a binder and then passed through a drying oven. Tension on the elastic yarn relaxed and more heat is applied to cause the elastic yarns to retract or shrink, creating a shirred elastic material.

Other patents disclose reinforced textile matrices and stabilized continuous filament webs in which threads or molecularly oriented continuous filaments are stabilized in a substantially parallel relationship. For example, U.S. Pat. No. 4,680,213 discloses a reinforced textile matrix and U.S. Pat. No. 4,910,064 discloses a substantially parallel array of molecularly oriented continuous filaments stabilized by meltblown fibers to create a coherent nonwoven fibrous web.

However, there is still a need for an inexpensive composite elastic material having stretch and recovery in only one direction, which is suited for high-speed manufacturing processes and which contains an elastic component that provides the desired elastic properties to the composite only in the one direction of stretch and recovery.

DEFINITIONS

The term "elastic" is used herein to mean any material which, upon application of a biasing force, is stretchable, that is, elongatable at least about 60 percent (i.e., to a stretched, biased length which is at least about 160 percent of its relaxed unbiased length), and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be elongated by much more than 60 percent (i.e., much more than 160 percent of their relaxed length), for example, elongated 100 percent or more, and many of these will recover to substantially their initial relaxed length, for example, to within 105 percent of their original relaxed length, upon release of the stretching force.

The term "nonelastic" as used herein refers to any material which does not fall within the definition of "elastic," above.

The terms "recover" and "recovery" as used herein refer to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length—final sample length)/(maximum stretch length—initial sample length)]×100.

The term "machine direction" as used herein refers to the direction of travel of the forming surface onto which fibers are deposited during formation of a nonwoven fibrous web.

The term "cross-machine direction" as used herein refers to the direction which is perpendicular to the machine direction defined above.

The term "strength index" as used herein means a ratio of the tensile load of a material in the machine direction (MD) at a given elongation with the tensile load of that same material in the cross-machine direction (CD) at the same elongation. Typically, the tensile load is determined at an elongation which is less than the ultimate elongation of the material (i.e., elongation at break). For example, if the ultimate elongation of an elastic material is about 600 percent in both the machine and cross-matching directions, the tensile load may be measured at an elongation at about 400 percent. In that case, the strength index may be expressed by the following equation:

$$\text{strength index} = (\text{MD tensile load}_{400\% \text{ elongation}}/\text{CD tensile load}_{400\% \text{ elongation}})$$

A material having a machine direction (MD) tensile toad greater than its cross-machine direction (CD) tensile load will have a strength index that is greater than one (1). A material having a machine direction tensile load less than its cross-machine direction tensile load will have a strength index that is less than one (1).

The term "isotropic" as used herein refers to a material characterized by a strength index ranging from about 0.5 to about two (2).

The term "anisotropic" as used herein refers to material characterized by a strength index which is than about 0.5 or greater than about two (2). For example, an anisotropic nonwoven web may have a strength index about 0.25 or about three (3).

The term "composite elastic material" as used herein refers to a multilayer material having at least one elastic layer joined to at least one gatherable layer at least two locations in which the gatherable layer is gathered between the locations where it is joined to the elastic layer. A composite elastic material may be stretched the extent that the nonelastic material gathered between the bond locations allows the elastic material to elongate. This type of composite elastic material is disclosed, example, by U.S. Pat. No. 4,720,415 to Vander Wielen et al., issued Jan. 19, 1988, which is hereby incorporated by reference.

The term "stretch-to-stop" as used herein refers to ratio determined from the difference between the unextended dimension of a composite elastic material and the maximum extended dimension of a composite elastic material upon application of a specified tensioning force and dividing that difference by the unextended dimension of the composite elastic material. If the stretch-to-stop is expressed in percent, this ratio is multiplied by 100. For example, a composite elastic material having an unextended length of 5 inches and a maximum extended length of inches upon applying a force of 2000 grams has a stretch-to-stop (at 2000 grams) of 100 percent. Stretch-to-stop may also be referred to as "maximum non-destructive elongation". Unless specified otherwise, stretch-to-stop values are reported herein at a load of 2000 grams.

The term "tenacity" as used herein refers to the resistance to elongation of a composite elastic material which is provided by its elastic component. Tenacity the tensile load of a composite elastic material at specified strain (i.e., elongation) for a given width material divided by the basis weight of that composite material's elastic component as measured at about the composite material's stretch-to-stop elongation. For example, tenacity of a composite elastic material typically determined in one direction (e.g., machine direction) at about the composite material's stretch-to-stop elongation. Elastic materials having high values for tenacity are desirable in certain applications because less material is needed to provide a specified resistance to elongation than a low tenacity material. For a specified sample width, tenacity is reported in units of force divided by the units of basis weight of the elastic component. This provides a measure of force per unit area and is accomplished by reporting the thickness of the elastic component in terms of its basis weight rather than as an actual caliper measurement. For example, reported units may be grams $_{force}$ (for a specific sample width)/grams per square meter. Unless specified otherwise, all tenacity data is reported for the first extension of a three (3) inch wide sample having a four (4) inch gauge length.

As used herein, the term "nonwoven web" means a web having a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "autogenous bonding" means bonding provided by fusion and/or self-adhesion of fibers and/or filaments without an applied external adhesive or bonding agent. Autogenous bonding may be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments which remains after the solvent is removed.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "microfibers" means small diameter fibers having an average diameter not greater than about 100 microns, for example, having an average diameter of from about 0.5 microns to about 50 microns, or more particularly, microfibers may have an average diameter of from about 4 microns to about 40 microns.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spun-bonding mechanisms. The production of spun-bonded nonwoven webs is illustrated in patents such as, for example, in U.S. Pat.

No. 4,340,563 to Appel et al., and U.S. Pat. No. 3,692,618 to Dorschner et al. The disclosures of these patents are hereby incorporated by reference.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "superabsorbent" refers to absorbent materials capable of absorbing at least 10 grams of aqueous liquid (e.g. distilled water per gram of absorbent material while immersed in the liquid for 4 hours and holding substantially all of the absorbed liquid while under a compression force of up to about 1.5 psi.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates and materials added to enhance processability of the composition.

SUMMARY OF THE INVENTION

Problems associated with previous composite elastic materials have been addressed by the composite elastic material of the present invention which is adapted to provide improved tenacity in one direction. The composite elastic material contains at least one anisotropic elastic fibrous web and at least one gatherable layer joined at spaced apart locations to the anisotropic elastic fibrous web so that the gatherable layer is gathered between the spaced-apart locations.

The gatherable layer may be a nonwoven web of fibers, such as, for example, a web of spunbonded fibers, a web of meltblown fibers, a bonded carded web of fibers, a multilayer material including at least one of the webs of spunbonded fibers, meltblown fibers, or a bonded carded web of fibers. The gatherable layer may also be a mixture of fibers and one or more other materials such as, for example, wood pulp, staple-length fibers, particulates and super-absorbent materials.

The anisotropic elastic fibrous web contains at least one layer of elastomeric meltblown fibers and at least one layer of substantially parallel rows of elastomeric filaments. The substantially parallel rows of elastomeric filaments are autogenously bonded to at least a portion of the meltblown fibers. This autogenous bonding may take place, for example, by forming molten elastomeric filaments directly on a layer of meltblown fibers. Likewise, a layer of meltblown fibers may be formed directly on a layer of substantially parallel rows of elastomeric filaments to provide the desired autogenous bonding.

In one aspect of the present invention, the elastomeric filaments may have an average diameter ranging from about 40 to about 750 microns. For example, the elastomeric filaments may have an average diameter ranging from about 100 to about 500 microns. Desirably, the elastomeric filaments will range from about 250 to about 350 microns and will make up at least about 20 percent, by weight, of the nonwoven elastic fibrous web. For example, the nonwoven elastic fibrous web may contain from about 20 to about 80 percent, by weight, of elastomeric filaments.

DETAILED DESCRIPTION OF THE INVENTION

The present invention provides a composite elastic material such as, for example, a stretch-bonded laminate which is adapted to provide improved tenacity in one direction. This composite elastic material includes an anisotropic elastic fibrous web that is a composite of elastomeric filaments and elastomeric meltblown fibers. Referring now to the drawings wherein like reference numerals represent the same or equivalent structure and, in particular, to FIG. 1 of the drawings there is schematically illustrated at 10 a process for forming a stretch-bonded laminate which includes an anisotropic elastic fibrous web.

Figure 1:
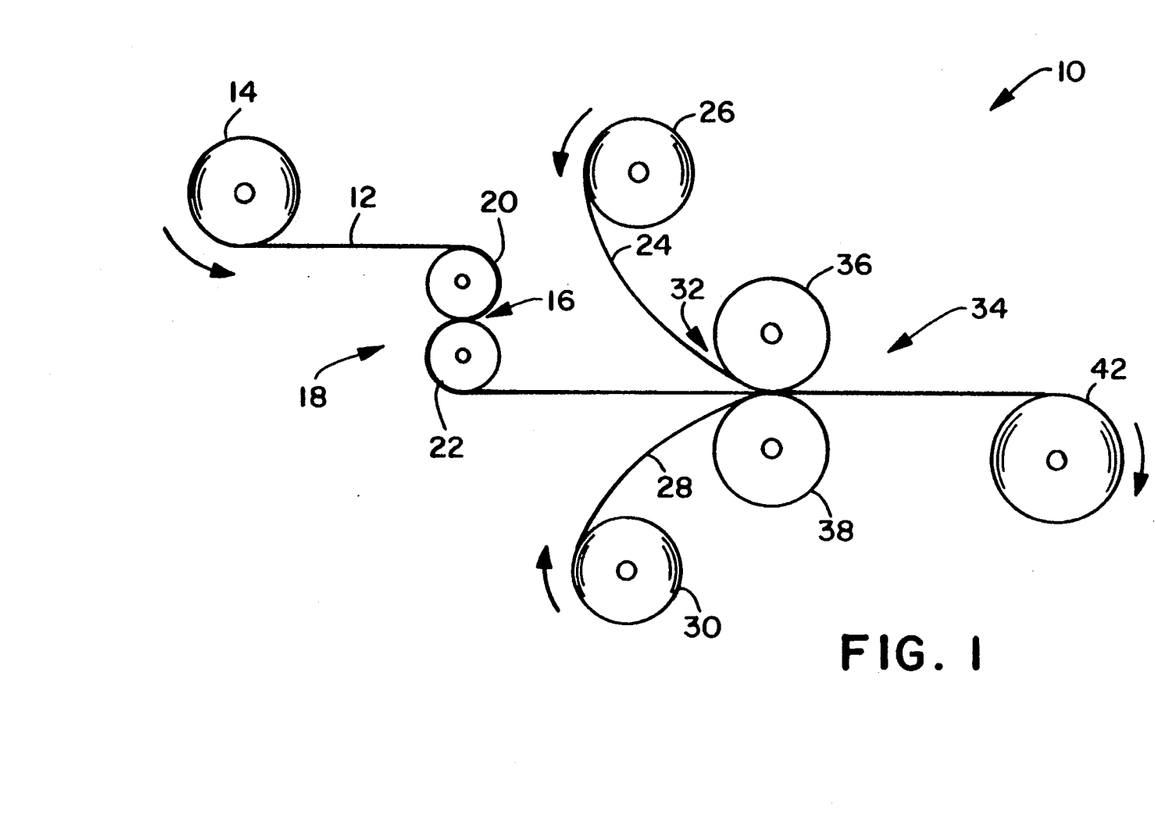
FIG. 1 is a schematic drawing of an exemplary process for forming a composite elastic material.

According to the present invention, an anisotropic elastic fibrous web 12 is unwound from a supply roll 14 and travels in the direction indicated by the arrow associated therewith as the supply roll 14 rotates in the direction of the arrows associated therewith. The anisotropic elastic fibrous web 12 passes through a nip 16 of the S-roll arrangement 18 formed by the stack rollers 20 and 22.

The anisotropic elastic fibrous web 12 may also be formed in a continuous process such as, for example, the process described below, and passed directly through the nip 16 without first being stored on a supply roll.

A first gatherable layer 24 is unwound from a supply roll 26 and travels in the direction indicated by the arrow associated therewith as the supply roll 26 rotates in the direction of the arrows associated therewith. A second gatherable layer 28 is unwound from a second supply roll 30 and travels in the direction indicated by the arrow associated therewith as the supply roll 30 rotates in the direction of the arrows associated therewith.

The first gatherable layer 24 and second gatherable layer 28 pass through the nip 32 of the bonder roller arrangement 34 formed by the bonder rollers 36 and 38. The first gatherable layer 24 and/or the second gatherable layer 28 may be formed by extrusion processes such as, for example, meltblowing processes, spunbonding processes or film extrusion processes and passed directly through the nip 32 without first being stored on a supply roll.

The anisotropic elastic fibrous web 12 passes through the nip 16 of the S-roll arrangement 18 in a reverse-S path as indicated by the rotation direction arrows associated with the stack rollers 20 and 22. From the S-roll arrangement 18, the anisotropic elastic fibrous web 12 passes through the pressure nip 32 formed by a bonder roller arrangement 34. Additional S-roll arrangements (not shown) may be introduced between the S-roll arrangement and the bonder roller arrangement to stabilize the stretched material and to control the amount of stretching. Because the peripheral linear speed of the rollers of the S-roll arrangement 18 is controlled to be less than the peripheral linear speed of the rollers of the bonder roller arrangement 34, the anisotropic elastic fibrous web 12 is tensioned between the S-roll arrangement 18 and the pressure nip of the bonder roll arrangement 32. Importantly, the filaments of the anisotropic elastic fibrous web 12 should run along the direction that web is stretched so that they can provide the desired stretch properties in the finished composite material. By adjusting the difference in the speeds of the rollers, the anisotropic elastic fibrous web 12 is tensioned so that stretches a desired amount and is maintained in such stretched condition while the first gatherable layer 24 and second gatherable layer 28 is joined to the anisotropic elastic fibrous web 12 during their passage through the bonder roller arrangement 34 to form a composite elastic material 40.

The composite elastic material 40 immediately relaxes upon release of the tensioning force provided by the S-roll arrangement 18 and the bonder roll arrangement 34, whereby the first gatherable layer 24 and the second gatherable layer 28 are gathered in the composite elastic material 40. The composite elastic material 40 is then wound up on a winder 42. Processes of making composite elastic materials of this type are described in, for example, U.S. Pat. No. 4,720,415, the disclosure of which is hereby incorporated by reference.

The gatherable layers 24 and 28 may be nonwoven materials such as, for example, spunbonded webs, meltblown webs, or bonded carded webs. In one embodiment of the present invention, one or both of the gatherable layers 24 and 28 is a multilayer material having, for example, at least one layer of spunbonded web joined to at least one layer of meltblown web, bonded carded web or other suitable material.

One or both of the gatherable layers 24 and 28 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as superabsorbent materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

One or both of the gatherable layers 24 and 28 may be made of pulp fibers, including wood pulp fibers, to form a material such as, for example, a tissue layer. Additionally, the gatherable layers may be layers of hydraulically entangled fibers such as, for example, hydraulically entangled mixtures of wood pulp and staple fibers such as disclosed in U.S. Pat. No. 4,781,966, the disclosure of which is hereby incorporated by reference.

The gatherable layers 24 and 28 may be joined to the anisotropic elastic fibrous web 12 at least at two places by any suitable means such as, for example, thermal bonding or ultrasonic welding which softens at least portions of at least one of the materials, usually the elastic fibrous web because the elastomeric materials used for forming the anisotropic elastic fibrous web 12 have a lower softening point than the components of the gatherable layers 24 and 28. Joining may be produced by applying heat and/or pressure to the overlaid anisotropic elastic fibrous web 12 and the gatherable layers 24 and 28 by heating these portions (or the overlaid layer) to at least the softening temperature of the material with the lowest softening temperature to form a reasonably strong and permanent bond between the re-solidified softened portions of the anisotropic elastic fibrous web 12 and the gatherable layers 24 and 28.

The bonder roller arrangement 34 may be a smooth anvil roller 36 and a patterned calendar roller 38, such as, for example, a pin embossing roller arranged with a smooth anvil roller. One or both of the smooth anvil roller 36 and the calendar roller 38 may be heated and the pressure between these two rollers may be adjusted by well-known means to provide the desired temperature, if any, and bonding pressure to join the gatherable layers to the elastic fibrous web. As can be appreciated, the bonding between the gatherable layers and the elastic sheet is a point bonding. Various bonding patterns can be used, depending upon the desired tactile properties of the final composite laminate material. When the gatherable layer is a material such as, for example, spunbonded polypropylene, such bonding can be performed at temperatures as low as 60° F. A range of temperatures for the calendar rolls during bonding between a gatherable layer such as, for example, spunbond polypropylene and an elastic sheet is 60° to 180° F.

With regard to thermal bonding, one skilled in the art will appreciate that the temperature to which the materials, or at least the bond sites thereof, are heated for heat-bonding will depend not only on the temperature of the heated roll(s) or other heat sources but on the residence time of the materials on the heated surfaces, the compositions of the materials, the basis weights of the materials and their specific heats and thermal conductivities. However, for a given combination of materials, and in view of the herein contained disclosure the processing conditions necessary to achieve satisfactory bonding can be readily determined by one of skill in the art.

Conventional drive means and other conventional devices which may be utilized in conjunction with the apparatus of FIG. 1 are well known and, for purposes of clarity, have not been illustrated in the schematic view of FIG. 1.

As discussed above, an important component of the composite elastic material 40 is the anisotropic elastic fibrous web 12. That elastic web contains at least two layers of materials; at least one layer is a layer of elastomeric meltblown fibers and at least one other layer is a layer containing substantially parallel rows of elastomeric filaments autogenously bonded to at least a portion of the elastomeric meltblown fibers. These elastomeric filaments have an average diameter ranging from about 40 to about 750 microns and extend along length (i.e. machine direction) of the fibrous web to improve the tenacity of the fibrous web in that direction.

Desirably, the elastomeric filaments may have an average diameter in the range from about 50 to about 500 microns, for example, from about 100 to about 200 microns. These elastomeric filaments extend along length (i.e. machine direction) of the fibrous web so that the tenacity of the anisotropic elastic fibrous web is at least about 10 percent greater in that direction than the tenacity of a substantially isotropic nonwoven web of about the same basis weight. For example, the tenacity of the anisotropic elastic fibrous web may be about 20 to about 90 percent greater in that direction than the tenacity of a substantially isotropic nonwoven web of about the same basis weight containing only elastomeric meltblown fibers.

Typically, the anisotropic elastic fibrous web will contain at least about 20 percent, by weight, of elastomeric filaments. For example, the elastic fibrous web may contain from about 20 percent to about 80 percent, by weight, of the elastomeric filaments. Desirably, the elastomeric filaments will constitute from about 40 to about 60 percent, by weight, of the anisotropic elastic fibrous web.

Figure 2:
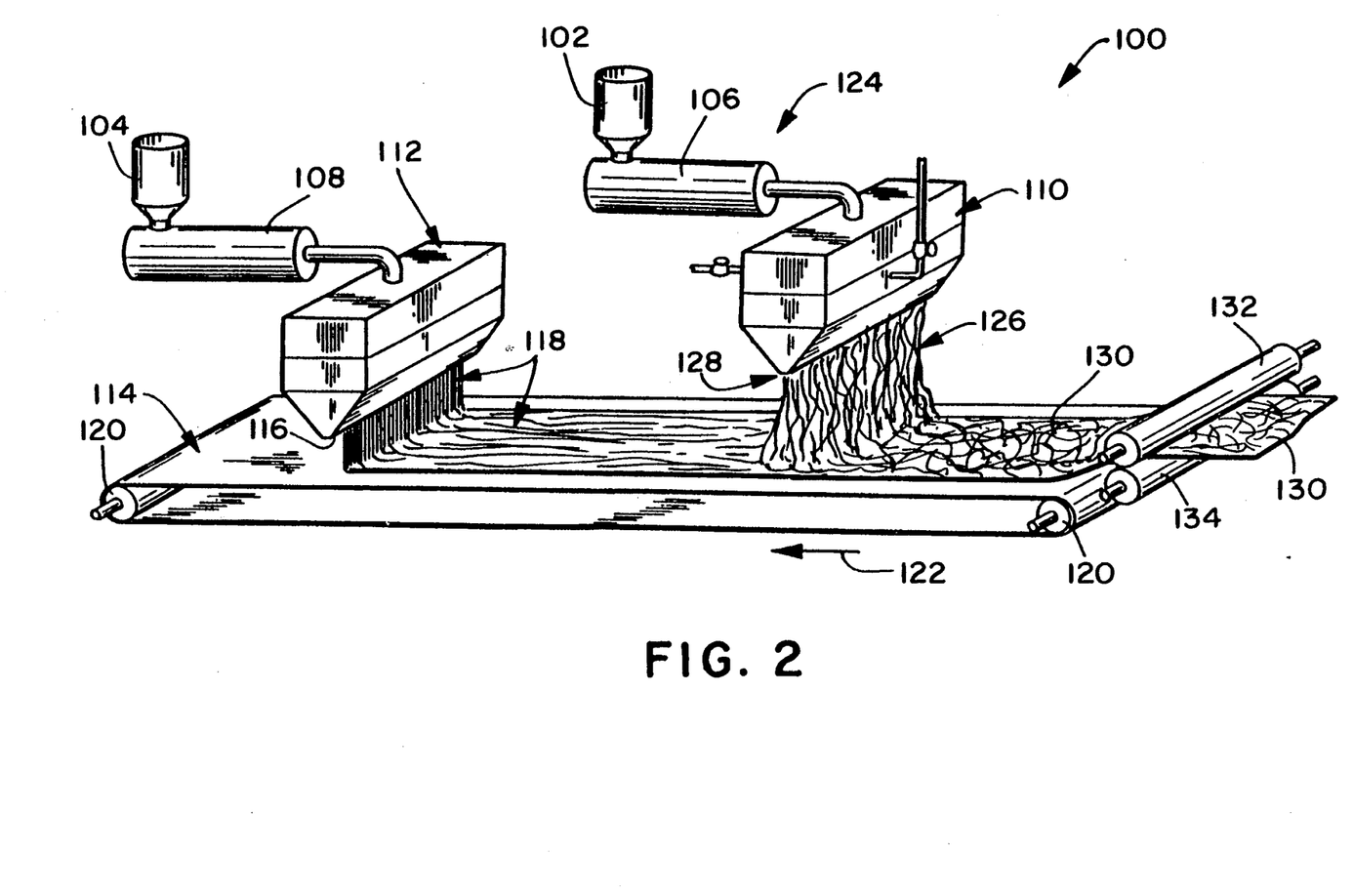
FIG. 2 is a schematic drawing of an exemplary process for forming an anisotropic elastic fibrous web which is a component of the composite elastic material of the present invention.

FIG. 2 is a schematic view of a process for forming an anisotropic elastic fibrous web which is used as a component of the composite elastic material of the present invention. The process is generally represented by reference numeral 100. In forming the fibers and the filaments which are used in the elastic fibrous web, pellets or chips, etc. (not shown) of an extrudable elastomeric polymer are introduced into a pellet hoppers 102 and 104 of extruders 106 and 108.

Each extruder has an extrusion screw (not shown) which is driven by a conventional drive motor (not shown). As the polymer advances through the extruder, due to rotation of the extrusion screw by the drive motor, it is progressively heated to a molten state. Heating the polymer to the molten state may be accomplished in a plurality of discrete steps with its temperature being gradually elevated as it advances through discrete heating zones of the extruder 106 toward a meltblowing die 110 and extruder 108 toward a continuous filament forming means 112. The meltblowing die 110 and the continuous filament forming means 112 may be yet another heating zone where the temperature of the thermoplastic resin is maintained at an elevated level for extrusion. Heating of the various zones of the extruders 106 and 108 and the meltblowing die 110 and the continuous filament forming means 112 may be achieved by any of a variety of conventional heating arrangements (not shown).

The elastomeric filament component of the anisotropic elastic fibrous web may be formed utilizing a variety of extrusion techniques. For example, the elastic filaments may be formed utilizing one or more conventional meltblowing die arrangements which have been modified to remove the heated gas stream (i.e., the primary air stream) which flows generally in the same direction as that of the extruded threads to attenuate the extruded threads. This modified meltblowing die arrangement 112 usually extends across a foraminous collecting surface 114 in a direction which is substantially transverse to the direction of movement of the collecting surface 114. The modified die arrangement 112 includes a linear array 116 of small diameter capillaries aligned along the transverse extent of the die with the transverse extent of the die being approximately as long as the desired width of the parallel rows of elastomeric filaments which is to be produced. That is, the transverse dimension of the die is the dimension which is defined by the linear array of die capillaries. Typically, the diameter of the capillaries will be on the order of from about 0.01 inches to about 0.02 inches, for example, from about 0.0145 to about 0.018 inches. From about 5 to about 50 such capillaries will be provided per linear inch of die face. Typically, the length of the capillaries will be from about 0.05 inches to about 0.20 inches, for example, about 0.113 inches to about 0.14 inches long. A meltblowing die can extend from about 20 inches to about 60 or more inches in length in the transverse direction.

Since the heated gas stream (i.e., the primary air stream) which flows past the die tip is greatly reduced or absent, it is desirable to insulate the die tip or provide heating elements to ensure that the extruded polymer remains molten and flowable while in the die tip. Polymer is extruded from the array 116 of capillaries in the modified die 112 to create extruded elastomeric filaments 118.

The extruded elastomeric filaments 118 have an initial velocity as they leave the array 116 of capillaries in the modified die 112. These filaments 118 are deposited upon a foraminous surface 114 which should be moving at least at the same velocity as the initial velocity of the elastic filaments 118. This foraminous surface 114 is an endless belt conventionally driven by rollers 120. The filaments 118 are deposited in substantially parallel alignment on the surface of the endless belt 114 which is rotating as indicated by the arrow 122 in FIG. 2. Vacuum boxes (not shown) may be used to assist in retention of the matrix on the surface of the belt 114. The tip of the die 112 is should be as close as practical to the surface of the foraminous belt 114 upon which the continuous elastic filaments 118 are collected. For example, this forming distance may be from about 2 inches to about 10 inches. Desirably, this distance is from about 2 inches to about 8 inches.

It may be desirable to have the foraminous surface 114 moving at a speed that is much greater than the initial velocity of the elastic filaments 118 in order to enhance the alignment of the filaments 118 into substantially parallel rows and/or elongate the filaments 118 so they achieve a desired diameter. For example, alignment of the elastomeric filaments 118 may be enhanced by having the foraminous surface 114 move at a velocity from about 2 to about 10 times greater than the initial velocity of the elastomeric filaments 118. Even greater speed differentials may be used if desired. While different factors will affect the particular choice of velocity for the foraminous surface 114, it will typically be from about four to about eight times faster than the initial velocity of the elastomeric filaments 118.

Desirably, the continuous elastomeric filaments are formed at a density per inch of width of material which corresponds generally to the density of capillaries on the die face. For example, the filament density per inch of width of material may range from about 10 to about 120 such filaments per inch width of material. Typically, lower densities of filaments (e.g., 10–35 filaments per inch of width) may be achieved with only one filament forming die. Higher densities (e.g., 35–120 filaments per inch of width) may be achieved with multiple banks of filament forming equipment.

The meltblown fiber component of the anisotropic elastic fibrous web is formed utilizing a conventional meltblowing process represented by reference numeral 124. Meltblowing processes generally involve extruding a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter. Such meltblowing techniques, and apparatus therefor, are discussed fully in U.S. Pat. No. 4,663,220, the contents of which are incorporated herein by reference.

In the meltblown die arrangement 110, the position of air plates which, in conjunction with a die portion define chambers and gaps, may be adjusted relative to the die portion to increase or decrease the width of the attenuating gas passageways so that the volume of attenuating gas passing through the air passageways during a given time period can be varied without varying the velocity of the attenuating gas. Generally speaking, lower attenuating gas velocities and wider air passageway gaps are generally preferred if substantially continuous meltblown fibers or microfibers are to be produced.

The two streams of attenuating gas converge to form a stream of gas which entrains and attenuates the molten threads, as they exit the orifices, into fibers depending upon the degree of attenuation, microfibers, of a small diameter which is usually less than the diameter of the orifices. The gas-borne fibers or microfibers 126 are blown, by the action of the attenuating gas, onto a collecting arrangement which, in the embodiment illustrated in FIG. 2, is the foraminous endless belt 114 which carries the elastomeric filament in substantially parallel alignment. The fibers or microfibers 126 are collected as a coherent matrix of fibers on the surface of the elastomeric filaments 118 and foraminous endless belt 114 which is rotating as indicated by the arrow 122 in FIG. 2. If desired, the meltblown fibers or microfibers 126 may be collected on the foraminous endless belt 114 at numerous impingement angles. Vacuum boxes (not shown) may be used to assist in retention of the matrix on the surface of the belt 114. Typically the tip 128 of the die 110 is from about 6 inches to about 14 inches from the surface of the foraminous belt 116 upon which the fibers are collected. The entangled fibers or microfibers 124 autogenously bond to at least a portion of the elastic continuous filaments 18 because the fibers or microfibers 124 are still somewhat tacky or molten while they are deposited on the elastic continuous filaments 118, thereby forming the anisotropic elastic fibrous web 130.

At this point, it may be desirable to lightly calender the elastic fibrous web of meltblown fibers and filaments in order to enhance the autogenous bonding. This calendering may be accomplished with a pair of patterned or un-patterned pinch rollers 132 and 134 under sufficient pressure (and temperature, if desired) to cause permanent autogenous bonding between the elastomeric filaments and the elastomeric meltblown fibers.

As discussed above, the elastomeric filaments and elastomeric meltblown fibers are deposited upon a moving foraminous surface. In one embodiment of the invention, meltblown fibers are formed directly on top of the extruded elastomeric filaments. This is achieved by passing the filaments and the foraminous surface under equipment which produces meltblown fibers. Alternatively, a layer of elastomeric meltblown fibers may be deposited on a foraminous surface and substantially parallel rows of elastomeric filaments may be formed directly upon the elastomeric meltblown fibers. Various combinations of filament forming and fiber forming equipment may be set up to produce different types of elastic fibrous webs. For example, the elastic fibrous web may contain alternating layers of elastomeric filaments and elastomeric meltblown fibers. Several dies for forming meltblown fibers or creating elastomeric filaments may also be arranged in series to provide superposed layers of fibers or filaments.

The elastomeric meltblown fibers and elastomeric filaments may be made from any material which may be manufactured into such fibers and filaments. Generally, any suitable elastomeric fiber forming resins or blends containing the same may be utilized for the elastomeric meltblown fibers and any suitable elastomeric filament forming resins or blends containing the same may be utilized for the elastomeric filaments. The fibers and filaments may be formed from the same or different elastomeric resin.

For example, the elastomeric meltblown fibers and/or the elastomeric filaments may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The block copolymers may be, for example, (polystyrene/poly(ethylene-butylene)/polystyrene) block copolymers available from the Shell Chemical Company under the trademark KRATON® G. One such block copolymer may be, for example, KRATON® G-1657.

Other exemplary elastomeric materials which may be used include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastomeric meltblown fibers from polyester elastic materials is disclosed in, for example, U.S. Pat. No. 4,741,949 to Morman et al., hereby incorporated by reference. Useful elastomeric polymers also include, for example, elastic copolymers of ethylene and at least one vinyl monomer such as, for example, vinyl acetates, unsaturated aliphatic monocarboxylic acids, and esters of such monocarboxylic acids. The elastic copolymers and formation of elastomeric meltblown fibers from those elastic copolymers are disclosed in, for example, U.S. Pat. No. 4,803,117.

Processing aids may be added to the elastomeric polymer. For example, a polyolefin may be blended with the elastomeric polymer (e.g., the A-B-A elastomeric block copolymer) to improve the processability of the composition. The polyolefin must be one which, when so blended and subjected to an appropriate combination elevated pressure and elevated temperature conditions, extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothene NA 601 (also referred to herein as PE NA 601 or polyethylene NA 601). Two or more of the polyolefins may be utilized. Extrudable blends of elastomeric polymers and polyolefins are disclosed in, for example, previously referenced U.S. Pat. No. 4,663,220.

Desirably, the elastomeric meltblown fibers and/or the elastomeric filaments should have some tackiness adhesiveness to enhance autogenous bonding. For example, the elastomeric polymer itself may be tacky when formed into fibers and/or filaments or, alternatively, a compatible tackifying resin may be added to the extrudable elastomeric compositions described above to provide tackified elastomeric fibers and/or filaments that autogenously bond. In regard to the tackifying resins and tackified extrudable elastomeric compositions, note the resins and compositions as disclosed in U.S. Pat. No. 4,787,699, hereby incorporated by reference.

Any tackifier resin can be used which is compatible with the elastomeric polymer and can withstand the high processing (e.g., extrusion) temperatures. If the elastomeric polymer (e.g., A-B-A elastomeric block copolymer) is blended with processing aids such as, for example, polyolefins or extending oils, the tackifier resin should also be compatible with those processing aids. Generally, hydrogenated hydrocarbon resins are preferred tackifying resins, because of their better temperature stability. REGALREZ TM and ARKON TM series tackifiers are examples of hydrogenated hydrocarbon resins. ZONATAK TM 501 lite is an example of a terpene hydrocarbon. REGALREZ TM hydrocarbon resins are available from Hercules incorporated. ARKON TM series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

Typically, the blend used to form the elastomeric filaments and fibers include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON TM G-1657, about 17 to about 23 percent polyethylene NA 601, and about 15 to about 20 percent REGALREZ TM 1126.

The elastomeric meltblown fiber component of the present invention may be a mixture of elastic and nonelastic fibers or particulates. For an example of such a mixture, reference is made to U.S. Pat. No. 4,209,563, incorporated herein by reference, in which elastomeric and non-elastomeric fibers are commingled to form a single coherent web of randomly dispersed fibers. Another example of such an elastic composite web would be one made by a technique such as disclosed in previously referenced U.S. Pat. No. 4,741,949. That patent discloses an elastic nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, activated charcoal, clays, starches, or hydrocolloid (hydrogel) particulates commonly referred to as super-absorbents occurs prior to collection of the fibers upon a collecting device to form a coherent web of randomly dispersed fibers.

Figure 3:
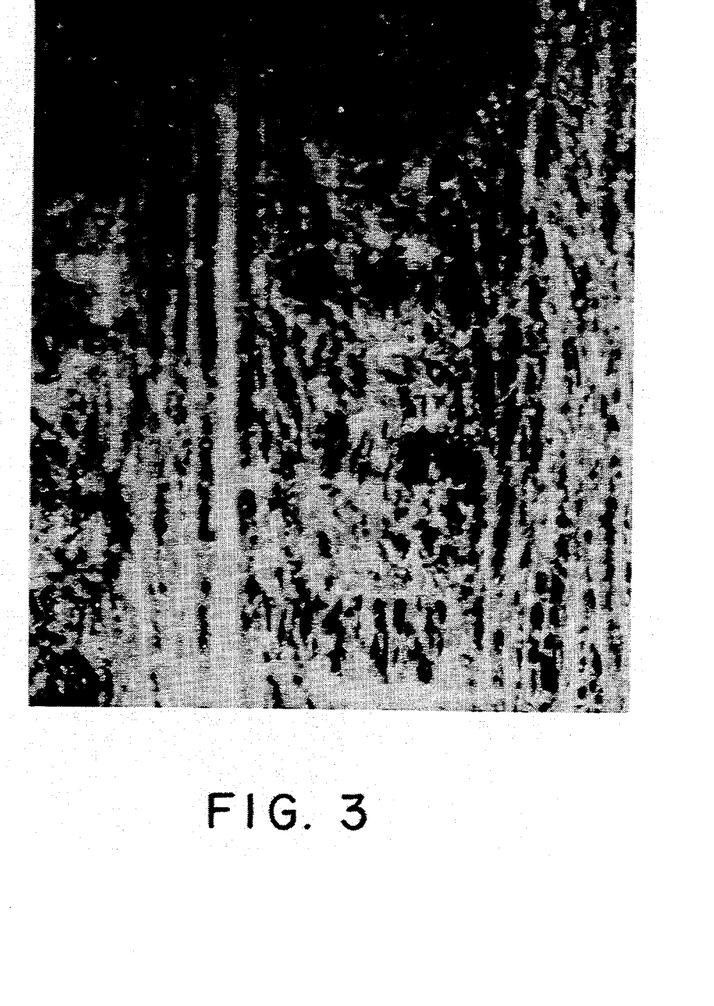
FIG. 3 is a low power photo-magnification of an exemplary anisotropic elastic fibrous web which is a component of the composite elastic material of the present invention.

FIG. 3 is a low power photo-magnification of an exemplary anisotropic elastic fibrous web which is a component of the composite elastic material of the present invention. The photo-magnification reveals substantially parallel rows of continuous filaments extending from the top to the bottom of the photo. Meltblown fibers are shown overlapping and intersecting the continuous filaments.

Figure 4:
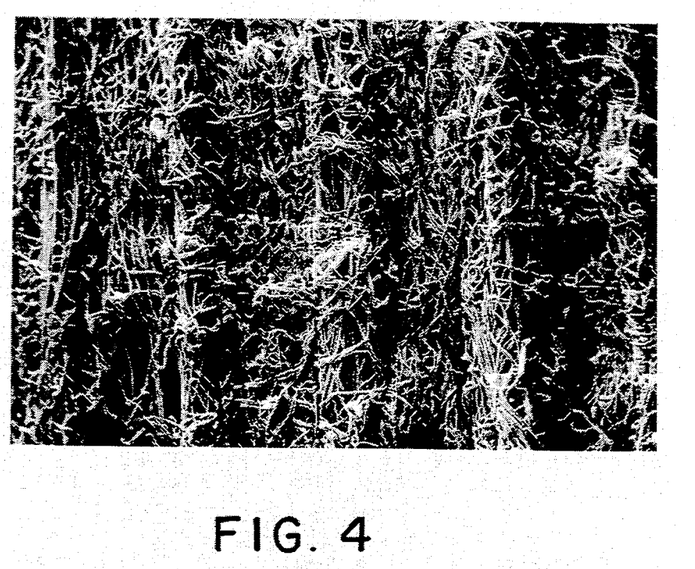
FIG. 4 is a photomicrograph of an exemplary anisotropic elastic fibrous web which is a component of the composite elastic material of the present invention.

FIG. 4 is a 24.9 X photomicrograph of an exemplary anisotropic elastic fibrous web which is a component of the composite elastic material of the present invention. FIG. 4 shows substantially parallel rows of continuous filaments covered by a layer of meltblown fibers. The substantially parallel rows of filaments run from the top of the photo to the bottom of the photo.

Figure 5:
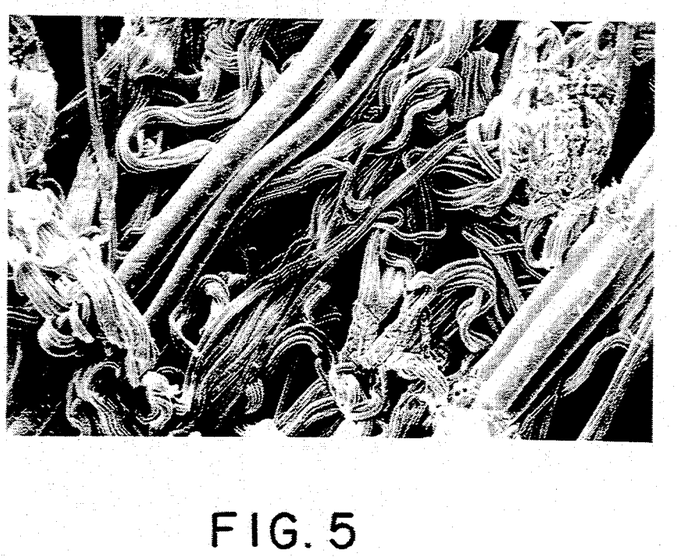
FIG. 5 is a photomicrograph of an exemplary anisotropic elastic fibrous web which is a component of the composite elastic material of the present invention.

FIG. 5 is a 24.9 X photomicrograph of an exemplary anisotropic elastic fibrous web which shows a flip-side of the material shown in FIG. 4. The substantially parallel rows of continuous filaments rest upon a layer of meltblown fibers.

Figure 6:
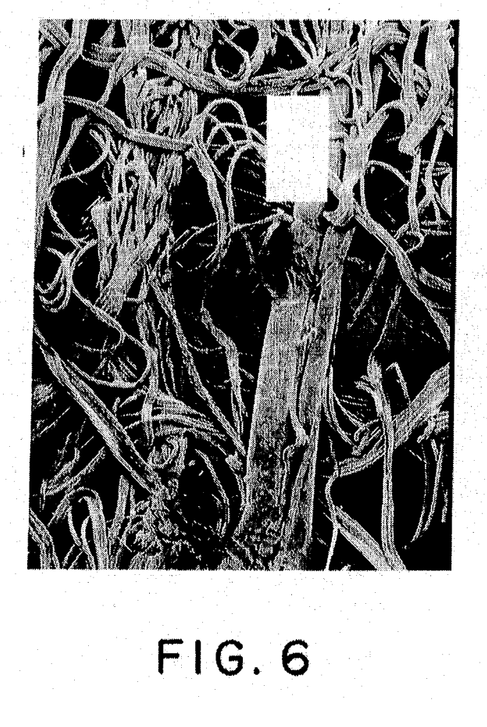
FIG. 6 is a photomicrograph of an exemplary anisotropic elastic fibrous web which is a component of the composite elastic material of the present invention.

FIG. 6 is a 20.4 X photomicrograph of an exemplary anisotropic elastic fibrous web which is a component of the composite elastic material of the present invention. A continuous filament can be seen running vertically through about the center of the photomicrograph surrounded by meltblown fibers.

Figure 7:
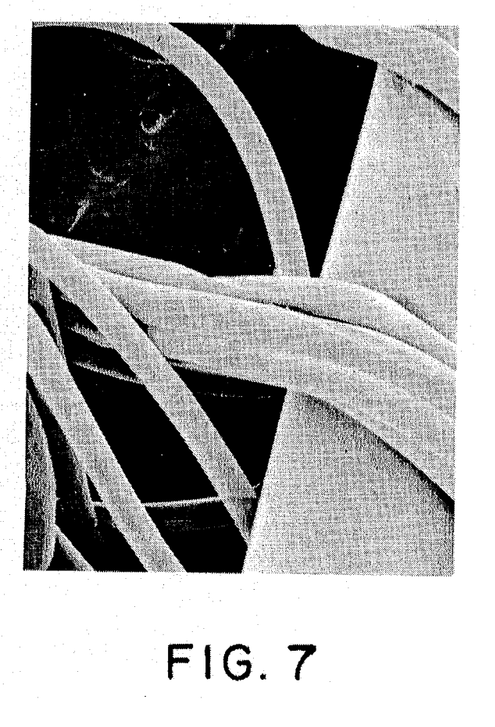
FIG. 7 is a 8 X magnification of a portion of FIG. 6.

FIG. 7 is a 8 X magnification of a portion of FIG. 6 detailing a section of a continuous filament and various meltblown fibers.

EXAMPLES

Composite elastic materials (i.e., stretch-bonded laminates) containing anisotropic elastic fibrous webs were made in the following manner.

Anisotropic Elastic Fibrous Web

A four-bank meltblowing process in which each bank was a conventional meltblown fiber forming apparatus was setup to extrude an elastomeric composition which contained about 63 percent, by weight, KRATON TM G-1657, about 17 percent, by weight, polyethylene NA 601, and about 20 percent, by weight, REGALREZ TM 1126. Meltblowing bank 1 was set-up to produce meltblown fibers; banks 2 and 3 were set-up to produce continuous filaments; and bank 4 was set-up to produce meltblown fibers. Each bank contained an extrusion tip having 0.016 inch diameter holes spaced at a density of about 30 capillary per lineal inch.

Polymer was extruded from the first bank at a rate of about 0.58 grams per capillary per minute (about 2.3 pounds per liner inch per hour) at a height of about 11 inches above the forming surface. A primary air-flow of about 14 ft$^3$/minute per inch of meltblowing die at about 3 psi was used to attenuate the extruded polymer into meltblown fibers and microfibers that were collected on a foraminous surface moving at a constant speed.

The meltblown fibers were carried downstream on the foraminous surface to the second bank which was an identical meltblown system except that the primary air flow was eliminated. Polymer was extruded at the same temperature and throughput rates into substantially parallel continuous filaments at a density of 30 filaments per lineal inch. A secondary air flow chilled to about 50 degrees Fahrenheit was used to cool the filaments. The difference in speed between the continuous filaments leaving the die tips and the foraminous surface aided the alignment of the continuous filaments into substantially parallel rows. The laminate of meltblown fibers and continuous filaments was carried to the third bank where an identical layer of substantially parallel continuous filaments was deposited at the same process conditions.

This composite was then carried to a fourth bank where a final layer of elastomeric meltblown fibers was deposited onto the multi-layer structure at the same conditions as the first bank. The layers of the structure were joined by autogenous bonding produced by directly forming one layer upon the other and enhanced by the tackifier resin added to the polymer blend.

Four samples of an anisotropic elastic fibrous web, identified as Samples 1 through 4, were prepared under the conditions reported in Table 1.

Tensile tests were conducted on an exemplary anisotropic elastic fibrous web prepared generally as described above from the same polymer blend. This material had 2 layers of meltblown fibers and 2 layers of substantially parallel continuous filaments (for a total filament density of about 60 filaments per lineal inch), a basis weight of about 60 gsm, and weight ratio of filaments to fibers of about 50:50. The tensile test revealed a strength index (i.e., machine direction tension versus cross-machine direction tension) from about 3 to about 5 when the tension was measured at an elongation of about 400 percent. It is contemplated that greater strength index values could be obtained by having higher proportion of filaments in the anisotropic fibrous web. Testing also showed that the ratio of tensile energy absorbed in the machine direction versus the cross-machine direction was from about 4:1 to about 6:1 when measured at an elongation of about 400 percent.

Control Elastic Fibrous Web

A substantially isotropic elastic fibrous web was made from the same polymer blend using only the first and fourth banks of the meltblown die configuration described above. The specific process conditions for forming the web are reported in Table 1 in the row heading "Control".

Stretch-bonded Laminate

The four-layer anisotropic elastic fibrous web was moved along at a rate of about 100 feet/minute by the foraminous wire, lifted off the wire by a pick-off roll moving at a rate about 25% faster and then drawn to a ratio of 4.8:1 (380%). At this extension the drawn elastic fibrous web was fed into a calender roller along with upper and lower non-elastic web facings. Each facing was a conventional polypropylene spunbond web having a basis weight 0.4 ounces per square yard (about 14 gsm) which was joined to the anisotropic elastic fibrous web at spaced apart locations to form a stretch-bonded laminate structure. The stretched-bonded laminate was relaxed as it exited the nip so that gathers and puckers would form. The laminate was wound onto a driven wind-up roll under slight tension.

The control elastic fibrous web was joined to identical polypropylene facing materials in the same manner to make a "control" stretch-bonded laminate. The specific process conditions for making the "control" stretch-bonded laminate and the stretch-bonded laminates containing the elastic webs of Samples 1-4 are reported in Table 1.

Tensile Testing

Tensile properties of the stretch-bonded laminates were measured on a Sintech 2 computerized material testing system available from Sintech, Incorporated of Stoughton, Mass. Sample size was about 3 inches by 7 inches (the 7 inch dimension was in the machine direction), gauge length was 100 mm (about 4 inches), stop load was set at 2000 grams, and the crosshead speed was about 500 millimeters per minute.

Figure 8:
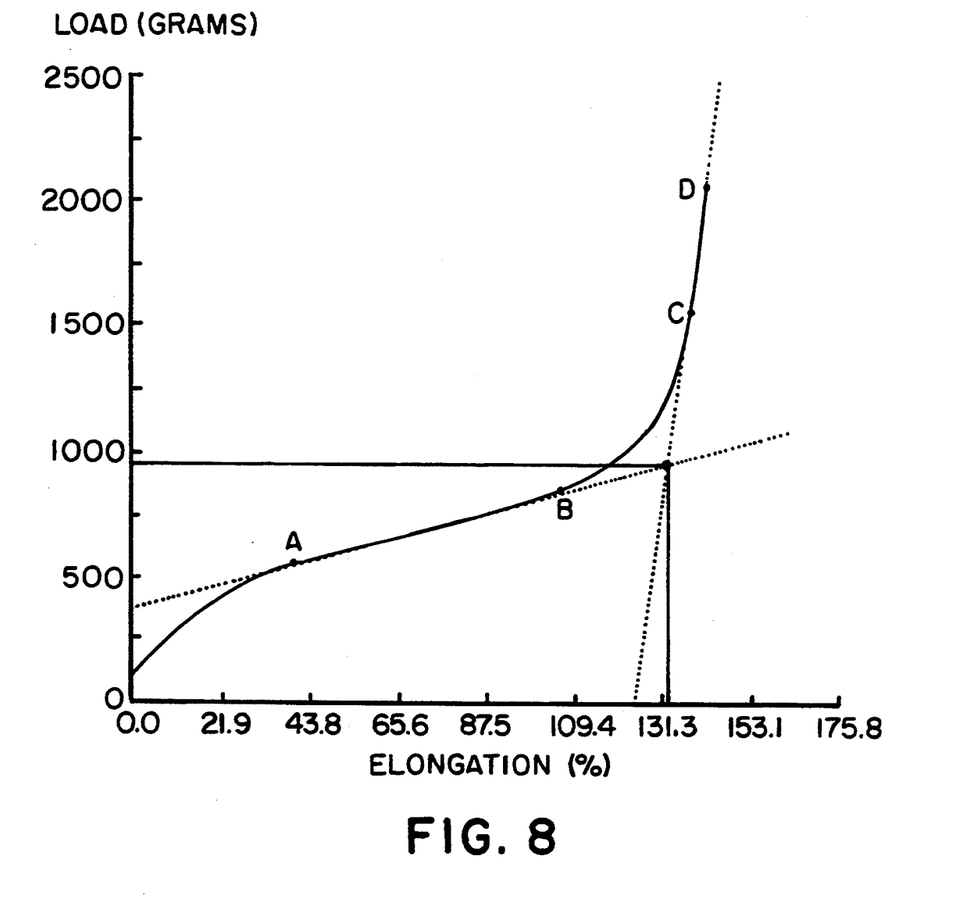
FIG. 8 is a graph of load versus elongation determined during tensile testing of an exemplary stretch-bonded laminate.

Data from the Sintech 2 system was used to generate loan versus elongation curves for each stretch-bonded laminate sample. FIG. 8 is a representation of an exemplary load versus elongation curve for the initial elongation of a stretch bonded laminate to a maximum applied load of 2000 grams. As can be seen from the graph, the slope of the line tangent to the curve between points A and B represents the general elongation versus load characteristics provided primarily by the elastic component of the stretch bonded laminate.

The slope of the load versus elongation curve increases substantially once the stretch-bonded laminate has been fully extended to eliminate the gathers or puckers in the laminate. This region of substantial increase in slope occurs at about the laminate's stretch-to-stop elongation. The slope of the line tangent to the curve between points C and D after this region represents the general elongation versus load characteristics provided primarily by the nonelastic component (i.e., the gatherable web) of the stretch-bonded laminate.

The intersection of the lines passing through A-B and C-D is referred to as the point of intercept. Load and elongation values reported at this point for different stretch-bonded laminates made under the same conditions (e.g., materials, draw ratios, etc.) are believed to provide a reliable comparison. Tenacity reported for each sample is the load at the point of intercept (for a 3 inch wide sample) divided by the basis weight of the material's elastic component at stretch-to-stop (i.e., at a 2000 gram load). The basis weight of the elastic component at stretch-to-stop is approximately the same as its basis weight at the point of intercept (i.e., stretch at intercept).

This basis weight of the elastic component at stretch-to-stop was calculated by measuring the relaxed or unstretched basis weight of the elastic component (separated from the stretch-bonded laminate) and then dividing that number by stretch-bonded laminate's stretch-to-stop elongation expressed as a percentage of the laminate's initial length. For example, a stretch-bonded laminate (4 inch gauge length) having a stretch-to-stop of about 11.2 inches (7.2 inches or 180 percent elongation) has a stretch-to-stop elongation that is about 280 percent of its initial 4 inch gauge length. The basis weight of the elastic component at the stretch-to-stop elongation would be its relaxed basis weight (i.e., separated from the stretch-bonded laminate) divided by 280 percent.

TABLE I

| SAMPLE | PROCESS CONDITIONS | | | | | |
|---|---|---|---|---|---|---|
| | MELT TEMP. CONT. FIL. | FORmING DISTANCE | WIRE FPM | CAL:WIRE RATIO | CAL:WIND RATIO | POLYNER RATE PTH × BANKS |
| CONTROL | — | 8" | 50 | 4.8 | 2.22 | 2.3 × 2 |
| 1 | 500 F | 8" | 125 | 4.8 | 2.22 | 2.3 × 4 |
| 2 | 480 F | 8" | 153 | 4.8 | 2.22 | 2.3 × 4 |
| 3 | 480 F | 8" | 125 | 4.8 | 2.22 | 2.3 × 4 |
| 4 | 480 F | 8" | 95 | 4.8 | 2.22 | 2.3 × 4 |

TABLE 2

| SAMPLE | PROPERTIES | | | | | | |
|---|---|---|---|---|---|---|---|
| | % FIL: % MB | FIL/IN. | Elastic Mat'l Basis Weight @ STS | Load @ Intcpt | Stretch @ Intcpt | 3" TEN. GmT/GSM | Elastic Mat'l Basis weight % Reduction |
| CONTROL | 0:100 | 0 | 22.83 | 816 | 181 | 35.7 | 0 |
| 1 | 50:50 | 60 | 17.34 | 838 | 208 | 48.3 | 20 |
| 2 | 50:50 | 60 | 13.96 | 746 | 178 | 53.4 | 36 |
| 3 | 50:50 | 60 | 17.45 | 918 | 220 | 52.6 | 20 |
| 4 | 50:50 | 60 | 24.11 | 1143 | 221 | 47.4 | 30 |

The load, elongation and tenacity values reported Table 2 are averages for 10 samples. As can be seen from Table 2, the composite elastic material (i.e., stretch-bonded laminate) containing the anisotropic elastic fibrous web provides a load at intercept which compares favorably with that of the Control material at similar elongations with much less elastic material, e.g., from about 20 to about 36 percent less elastic material. This is reflected in the increased tenacity values reported for Samples 1–4.

While the present invention has been described in connection with certain preferred embodiments, it is to be understood that the subject matter encompassed by way the present invention is not to be limited to those specific embodiments. On the contrary, it is intended for the subject matter of the invention to include all alternatives, modifications and equivalents as can be included within the spirit and scope of the following claims.

What is claimed is:

1. A composite elastic material adapted to provide improved tenacity in one direction, the composite material comprising:
   an anisotropic elastic fibrous web comprising:
   a first layer of elastomeric meltblown fibers; and,
   a second layer of substantially parallel elastomeric filaments autogenously bonded to at least a portion of the elastomeric meltblown fibers so that the elastic fibrous web is anisotropic; and
   at least one gatherable layer joined at spaced apart locations to the anisotropic elastic fibrous web so that the gatherable layer is gathered between the spaced-apart locations.

2. The composite elastic material of claim 1 wherein the anisotropic elastic fibrous web has a strength index of more than 2.

3. The composite elastic material of claim 1 wherein the anisotropic elastic fibrous web has a strength index of more than about 3.

4. The composite elastic material of claim 1 wherein the elastomeric meltblown fibers include meltblown microfibers.

5. The composite elastic material of claim 1 wherein the elastomeric filaments comprise at least about 10 percent, by weight, of the elastic fibrous web.

6. The composite elastic material of claim 5 wherein the elastomeric filaments comprise from about 25 to about 90 percent, by weight, of the elastic fibrous web.

7. The composite elastic material of claim 1 wherein the elastomeric filaments have an average diameter ranging from about 80 to about 500 microns.

8. The composite elastic material of claim 7 wherein the elastomeric filaments have an average diameter ranging from about 100 to about 200 microns.

9. The composite elastic material of claim 1 wherein the elastomeric meltblown fibers comprise an elastomeric polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block.

10. The composite elastic material of claim 9 wherein the elastomeric polymer is blended with a processing aid.

11. The composite elastic material of claim 9 wherein the elastomeric polymer is blended with a tackifying resin.

12. The composite elastic material of claim 11 wherein the blend further includes a processing aid.

13. The composite elastic material of claim 1 wherein the elastomeric filaments comprise an elastomeric polymer selected from the group consisting of elastic polyesters, elastic polyurethanes, elastic polyamides, elastic copolymers of ethylene and at least one vinyl monomer, and elastic A-B-A' block copolymers wherein A and A' are the same or different thermoplastic polymer, and wherein B is an elastomeric polymer block.

14. The composite elastic material of claim 1 wherein the layer of elastomeric meltblown fibers further comprises a mixture of elastomeric fibers and one or more other materials selected from the group consisting of wood pulp, nonelastic fibers, particulates and superabsorbent materials.

15. The composite elastic material of claim 14, wherein said nonelastic fibers are selected from the group consisting of polyester fibers, polyamide fibers, glass fibers, polyolefin fibers, cellulosic derived fibers, multi-component fibers, natural fibers, absorbent fibers.

electrically conductive fibers or blends of two or more of said nonelastic fibers.

16. The composite elastic material of claim 14, wherein said particulate materials are selected from the group consisting of activated charcoal, clays, starches, and metal oxides.

17. The composite elastic material of claim 1 wherein the machine direction tenacity of the composite is at least about 10 percent greater than that measured for an identical composite containing a substantially isotropic elastic fibrous web.

18. The composite elastic material of claim 1 wherein the tenacity of a three inch wide strip of the composite is at least about 40 grams$_{force}$/grams per square meter.

19. The composite elastic material of claim 18 wherein the tenacity of a three inch wide strip of the composite is from about 45 to about 85 grams$_{force}$/grams per square meter.

20. The composite elastic material of claim 1 wherein the gatherable layer is a nonwoven web of fibers.

21. The composite elastic material of claim 20 wherein the gatherable layer is selected from the group consisting of a web of spunbonded fibers, a web of meltblown fibers, a bonded carded web of fibers, a multi-layer material including at least one of the webs of spunbonded fibers, meltblown fibers, and a bonded carded web of fibers.

22. The composite elastic material of claim 20, wherein the gatherable layer is a composite material comprising a mixture of fibers and one or more other materials selected from the group consisting of wood pulp, staple fibers, particulates and super-absorbent materials.

23. A composite elastic material adapted to provide improved tenacity in one direction, the composite material consisting essentially of:
 an anisotropic elastic fibrous web consisting essentially of:
  at least one layer of elastomeric meltblown fibers; and,
  at least one layer of substantially parallel elastomeric filaments autogenously bonded to at least a portion of the elastomeric meltblown fibers so that the elastic fibrous web is anisotropic; and
 at least one gatherable layer joined at spaced apart locations to the oriented elastic fibrous web so that the gatherable layer is gathered between the spaced-apart locations.

* * * * *

UNITED STATES PATENT AND TRADEMARK OFFICE
CERTIFICATE OF CORRECTION

PATENT NO. : 5,385,775
DATED : January 31, 1995
INVENTOR(S) : Robert D. Wright

It is certified that error appears in the above-indentified patent and that said Letters Patent is hereby corrected as shown below:

Column 1, line 19, "when the elastic sheet relaxed," should read --when the elastic sheet is relaxed,--;

Column 1, line 46, "components single use" should read --components of single use--;

Column 1, line 49, "webs and elastic tend to be" should read --webs and elastic films tend to be--;

Column 1, line 61, "a plurality elastic cords" should read --a plurality of elastic cords--;

Column 2, line 3, "elastic yarn relaxed" should read --elastic yarn is relaxed--;

Column 3, line 29, "refers to material" should read --refers to a material--;

Column 3, line 30, "which is than" should read --which is less than--;

Column 3, line 32, "strength index about 0.25" should read --strength index of about 0.25--;

Column 3, line 36, "at least two locations" should read --at least at two locations--;

Column 3, line 39, "stretched the extent" should read --stretched to the extent--;

Column 3, line 43, "disclosed, example," should read --disclosed, for example,--;

UNITED STATES PATENT AND TRADEMARK OFFICE
CERTIFICATE OF CORRECTION

PATENT NO. : 5,385,775  Page 2 of 3
DATED : January 31, 1995
INVENTOR(S) : Robert D. Wright It is certified that error appears in the above-indentified patent and that said Letters Patent is hereby corrected as shown below:

Column 3, line 46, "refers to ratio" should read --refers to a ration-

Column 3, line 50, "material upon application" should read --material upon the application--;

Column 3, line 56, "length of inches" should read --length of 10 inches--;

Column 3, line 64, "tenacity the tensile" should read --tenacity is the tensile--;

Column 3, line 65, "material at specified" should read --material at a specified--;

Column 3, line 66, "given width material" should read --given width of material--;

UNITED STATES PATENT AND TRADEMARK OFFICE
CERTIFICATE OF CORRECTION

PATENT NO. : 5,385,775

DATED : January 31, 1995

INVENTOR(S) : Robert D. Wright

It is certified that error appears in the above-indentified patent and that said Letters Patent is hereby corrected as shown below:

Column 4, line 2, "material typically" should read --material is typically--;

Column 7, line 27, "so that stretches" should read --so that it stretches--.

Signed and Sealed this

Twenty-ninth Day of August, 1995

Attest:

BRUCE LEHMAN

Attesting Officer  Commissioner of Patents and Trademarks